United States Patent
Ishizuka et al.

(10) Patent No.: US 9,831,735 B2
(45) Date of Patent: Nov. 28, 2017

(54) STATOR FOR ROTATING ELECTRIC MACHINE AND METHOD OF MANUFACTURING THE SAME

(71) Applicant: DENSO CORPORATION, Kariya, Aichi-pref. (JP)

(72) Inventors: Atsuo Ishizuka, Nagoya (JP); Tetsuya Gorohata, Anjo (JP)

(73) Assignee: DENSO CORPORATION, Kariya (JP)

( * ) Notice: Subject to any disclaimer, the term of this patent is extended or adjusted under 35 U.S.C. 154(b) by 406 days.

(21) Appl. No.: 13/949,790

(22) Filed: Jul. 24, 2013

(65) Prior Publication Data
US 2014/0035406 A1 Feb. 6, 2014

(30) Foreign Application Priority Data
Jul. 31, 2012 (JP) .................. 2012-170184

(51) Int. Cl.
  *H02K 15/02* (2006.01)
  *H02K 3/12* (2006.01)
  *H02K 3/38* (2006.01)

(52) U.S. Cl.
  CPC .................. *H02K 3/38* (2013.01); *H02K 3/12* (2013.01); *H02K 15/024* (2013.01); *Y10T 29/49009* (2015.01)

(58) Field of Classification Search
  CPC .......... H02K 3/38; H02K 3/12; H02K 15/024; H02K 2213/03; Y10T 29/49009
  USPC .......... 310/201, 71, 179, 216.095, 260, 180; 29/596
  See application file for complete search history.

(56) References Cited

U.S. PATENT DOCUMENTS

| | | | |
|---|---|---|---|
| 7,034,429 B2* | 4/2006 | Ichikawa et al. | 310/201 |
| 2003/0135980 A1 | 7/2003 | Ichikawa et al. | |
| 2005/0116571 A1 | 6/2005 | Ichikawa et al. | |
| 2005/0217105 A1 | 10/2005 | Ichikawa et al. | |
| 2006/0145558 A1 | 7/2006 | Kashihara et al. | |
| 2011/0240331 A1* | 10/2011 | Kikuchi et al. | 174/110 R |

FOREIGN PATENT DOCUMENTS

| | | |
|---|---|---|
| JP | 2000-166148 | 6/2000 |
| JP | 2003-324885 | 11/2003 |
| JP | 2004-032898 | 1/2004 |

(Continued)

*Primary Examiner* — Michael Andrews
*Assistant Examiner* — Noli Manaloto
(74) *Attorney, Agent, or Firm* — Nixon & Vanderhye P.C.

(57) ABSTRACT

A stator includes a hollow cylindrical stator core and a stator coil formed of a plurality of electric conductor segments. Each of the electric conductor segments includes, at least, an in-slot portion received in a corresponding slot of the stator core and a protruding portion that protrudes from the in-slot portion outside of the corresponding slot. Each of the electric conductor segments also has an insulating coat covering its outer surface. For each intersecting pair of the protruding portions of the electric conductor segments, at least one of the two protruding portions of the intersecting pair has an indentation formed in a side face thereof radially facing the other protruding portion at the intersection of the two protruding portions. Further, a thickness of the insulating coats at the indentations is substantially equal to a thickness of the insulating coats at the in-slot portions of the electric conductor segments.

2 Claims, 8 Drawing Sheets

(1ST EMBODIMENT)

(56) References Cited

FOREIGN PATENT DOCUMENTS

| JP | 3738733 | 11/2005 |
|---|---|---|
| JP | 2009-045907 | 3/2009 |
| JP | 4646038 | 12/2010 |

* cited by examiner

FIG.1

FRONT SIDE ← → REAR SIDE

FIG.10
(1ST EMBODIMENT)

FIG.11
(COMPARATIVE EXAMPLE)

STATOR FOR ROTATING ELECTRIC MACHINE AND METHOD OF MANUFACTURING THE SAME

CROSS-REFERENCE TO RELATED APPLICATION

This application is based on and claims priority from Japanese Patent Application No. 2012-170184, filed on Jul. 31, 2012, the content of which is hereby incorporated by reference in its entirety into this application.

BACKGROUND

1. Technical Field

The present invention relates to stators for rotating electric machines that are used in, for example, motor vehicles as electric motors and electric generators, and to methods of manufacturing the stators.

2. Description of Related Art

There are known, for example from Japanese Patents No. 3738733 and No. 4646038 (to be respectively referred to as Patent Documents 1 and 2 hereinafter), stators for rotating electric machines which include a hollow cylindrical stator core and a stator coil formed of a plurality of electric conductor segments mounted on the stator core. Specifically, the stator core has a plurality of slots formed therein; the slots are spaced from one another in the circumferential direction of the stator core. The electric conductor segments are partially received in the slots of the stator core so that they are radially aligned with one another in the slots and have respective protruding portions that protrude outside of the slots on an axial side of the stator core. All the protruding portions of the electric conductor segments together make up a coil end of the stator coil. Moreover, corresponding pairs of the protruding portions of the electric conductor segments are joined by, for example, welding. In addition, each of the electric conductor segments has an insulating coat covering its outer surface so that the electric conductor segments are electrically insulated from each other in the slots of the stator core.

Further, in the stator disclosed in Patent Document 1, each of the protruding portions of the electric conductor segments intersects at least one of the other protruding portions which is radially adjacent to the protruding portion. Further, each of the protruding portions of the electric conductor segments has an indentation (or a recess) formed in a side face thereof radially facing the at least one other protruding portion at the intersection therebetween. Consequently, with the indentations formed in the side faces of the protruding portions of the electric conductor segments, a sufficient clearance can be secured between each intersecting pair of the protruding portions of the electric conductor segments, thereby improving both electrical insulation between the protruding portions and cooling of the protruding portions via cooling air.

However, according to the disclosure of Patent Document 1, the indentations are formed in the side faces of the protruding portions of the electric conductor segments by pressing. Consequently, the thickness of the insulating coats covering the outer surfaces of the electric conductor segments may be reduced at the indentations, thereby lowering the insulating performance of the insulating coats at the indentations.

On other hand, in the stator disclosed in Patent Document 2, those portions of the electric conductor segments which are received in the slots of the stator core have a rectangular cross-sectional shape. Further, the thickness of the insulating coats covering those in-slot portions of the electric conductor segments is set to be smaller than the thickness of the insulating coats covering those portions of the electric conductor segments which protrude outside of the slots of the stator. Consequently, with the smaller thickness of the insulating coats covering the in-slot portions of the electric conductor segments, it is possible to more effectively transmit heat generated by the in-slot portions of the electric conductor segments to the stator core. At the same time, with the larger thickness of the insulating coats covering the protruding portions of the electric conductor segments, it is possible to secure electric insulation between the protruding portions of the electric conductor segments.

However, according to the disclosure of Patent Document 2, it may be difficult to reliably ensure electrical insulation between the in-slot portions of the electric conductor segments due to the smaller thickness of the insulating coats covering the in-slot portions.

SUMMARY

According to an exemplary embodiment, a stator for a rotating electric machine is provided which includes a hollow cylindrical stator core and a stator coil. The stator core has a plurality of slots formed therein; the slots are spaced from one another in the circumferential direction of the stator core. The stator coil is formed of a plurality of electric conductor segments mounted on the stator core. Each of the electric conductor segments includes, at least, an in-slot portion and a protruding portion. The in-slot portion is received in a corresponding one of the slots of the stator core. The protruding portion protrudes from the in-slot portion outside of the corresponding slot and extends obliquely with respect to an axial end face of the stator core. In each of the slots of the stator core, there are received a predetermined number of the in-slot portions of the electric conductor segments in radial alignment with each other. Each of the electric conductor segments has an insulating coat covering its outer surface so that the in-slot portions of the electric conductor segments are electrically insulated from each other in the slots of the stator core. Each of the protruding portions of the electric conductor segments has a distal end part; corresponding pairs of the distal end parts of the protruding portions of the electric conductor segments are joined to each other. Each of the protruding portions of the electric conductor segments radially faces and intersects at least one of the other protruding portions. For each intersecting pair of the protruding portions of the electric conductor segments, at least one of the two protruding portions of the intersecting pair has an indentation formed in a side face thereof radially facing the other protruding portion at the intersection of the two protruding portions. For each of those electric conductor segments which have the respective indentations formed in the side faces of the protruding portions thereof, a thickness of the insulating coat, which covers the outer surface of the electric conductor segment, at the indentation is substantially equal to a thickness of the insulating coat at the in-slot portion of the electric conductor segment.

Consequently, with the indentations, a sufficient clearance can be secured between each intersecting pair of the protruding portions of the electric conductor segments. As a result, it is possible to improve both electrical insulation between each intersecting pair of the protruding portions of the electric conductor segments and cooling of the protruding portions via cooling air.

Moreover, with the thickness of the insulating coats at the indentations substantially equal to the thickness of the insulating coats at the in-slot portions of the electric conductor segments, the insulating performance of the insulating coats is prevented from being lowered at the indentations.

It is preferable that for each intersecting pair of the protruding portions of the electric conductor segments, each of the two protruding portions of the intersecting pair has the indentation formed in the side face thereof radially facing the other protruding portion.

It is also preferable that the coating material, of which the insulating coats covering the outer surfaces of the electric conductor segments are formed, has a lower Young's modulus and a higher yield point than the metal material of which the electric conductor segments are made.

For each of those electric conductor segments which have the respective indentations formed in the side faces of the protruding portions thereof, the indentation may be preferably formed in only part of the side face of the protruding portion of the electric conductor segment.

It is preferable that for each of the protruding portions of the electric conductor segments, the distal end part of the protruding portion is radially offset from the remainder of the protruding portion.

According to the exemplary embodiment, there is also provided a method of manufacturing the stator. The method includes the steps of: (1) forming the indentations in the side faces of the respective protruding portions of the electric conductor segments by pressing; (2) inserting, from one axial side of the stator core, the in-slot portions of the electric conductor segments into the corresponding slots of the stator core so as to have the protruding portions of the electric conductor segments protruding outside of the corresponding slots on the other axial side of the stator core; (3) bending the protruding portions of the electric conductor segments so as to make each of the protruding portions of the electric conductor segments extend obliquely with respect to the axial end face of the stator core and thus radially face and intersect the at least one of the other protruding portions; and (4) joining the corresponding pairs of the distal end parts of the protruding portions of the electric conductor segments. Further, in the method, the electric conductor segments are made of a metal material and the insulating coats covering the outer surfaces of the electric conductor segments are formed of a coating material. The coating material has a lower Young's modulus and a higher yield point than the metal material. In the step of forming the indentations by pressing, the pressing load is set so as to be higher than the yield point of the metal material but not higher than the yield point of the coating material.

With the above method, it is possible to keep the thickness of the insulating coats at the indentations substantially equal to the thickness of the insulating coats at the in-slot portions of the electric conductor segments. As a result, it is possible to provide a sufficient clearance between each intersecting pair of the protruding portions of the electric conductor segments without lowering the insulating performance of the insulating coats at the indentations.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 1:
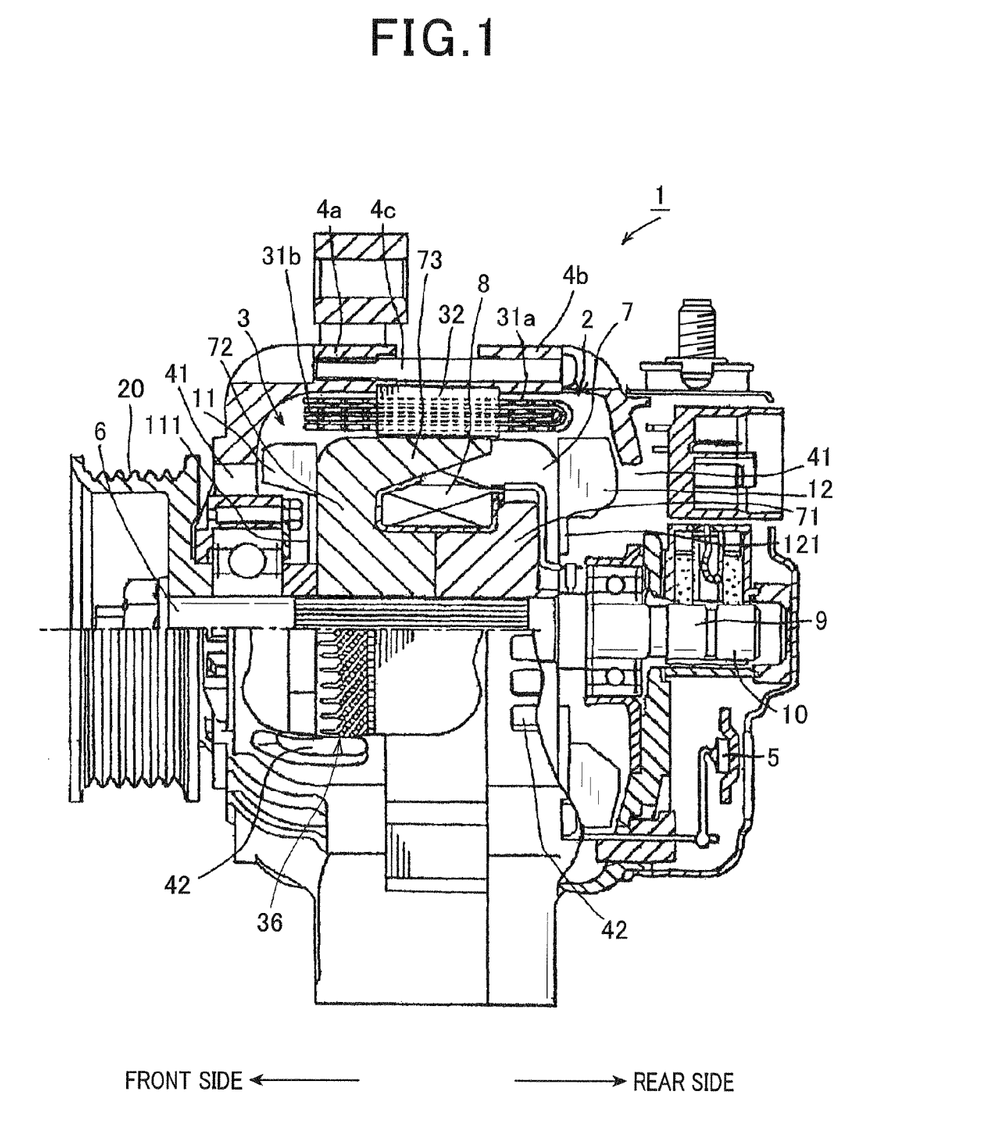
FIG. 1 is a cross-sectional view of an automotive alternator which includes a stator according to a first embodiment.

FIG. 1 shows the overall configuration of an automotive alternator 1 which includes a stator 2 according to a first embodiment. The alternator 1 is designed to be used in a motor vehicle, such as a passenger car or a truck.

As shown in FIG. 1, the alternator 1 includes: the stator 2 that functions as an armature; a rotor 3 that functions as a field; front and rear housings 4a and 4b that together support the rotor 3 and have the stator 2 fixed therebetween via fastening bolts 4c; and a rectifier 5 that rectifies AC power outputted from the stator 2 into DC power.

The rotor 3, which is configured to rotate together with a rotating shaft 6, includes a pair of Lundell-type magnetic pole cores 7, a field coil 8, slip rings 9 and 10, a mixed-flow cooling fan 11 and a centrifugal cooling fan 12.

The rotating shaft 6 has a pulley 20 mounted on a front end portion thereof so that it can be rotated by torque that is transmitted from an internal combustion engine (not shown) of the vehicle to the pulley 20 via a belt (not shown).

Each of the magnetic pole cores 7 has a hollow cylindrical boss portion 71, a disc portion 72, and a plurality of (e.g., six in the present embodiment) magnetic pole claws 73. The boss portion 71 is fitted on the rotating shaft 6 so as to rotate along with the rotating shaft 6. The disc portion 72 extends radially outward from an axially outer part of the boss portion 71. Each of the magnetic pole claws 73 axially extends from a radially outer part of the disc portion 72.

The magnetic pole cores 7 are assembled together so that the magnetic pole claws 73 of the front-side magnetic pole core 7 are interleaved with those of the rear-side magnetic pole core 7.

The field coil 8 is mounted on both the boss portions 71 of the magnetic pole cores 7 so as to be axially interposed between the disc portions 72 of the magnetic pole cores 7. In addition, the field coil 8 also abuts a radially inner part of each of the magnetic pole claws 73 of the magnetic pole cores 7.

The slip rings 9 and 10 are provided on a rear end portion of the rotating shaft 6 and respectively electrically connected to opposite ends of the field coil 8.

The mixed-flow cooling fan 11 includes a base plate 111 and a plurality of blades. The base plate 111 is fixed, for example by welding, to a front end face of the disc portion 72 of the front-side magnetic pole core 7. Some of the blades are fixed to the base plate 111 so as to be oblique at an acute angle to the base plate 111; the other blades are fixed to the base plate 111 so as to be perpendicular to the base plate 111.

The centrifugal cooling fan 12 includes a base plate 121 and a plurality of blades. The base plate 121 is fixed, for example by welding, to a rear end face of the disc portion 72 of the rear-side magnetic pole core 7. All the blades are fixed to the base plate 121 so as to be perpendicular to the base plate 121.

The front housing 4a has a plurality of cooling air inlets 41 formed through a front end wall thereof. The front housing 4a also has a plurality of cooling air outlets 42 that are formed through a circumferential wall of the front housing 4a so as to be radially opposite to a second coil end 31b of a stator coil 36 of the stator 2. On the other hand, the rear housing 4b has a plurality of cooling air inlets 41 formed through a rear end wall thereof. The rear housing 4b also has a plurality of cooling air outlets 42 that are formed through a circumferential wall of the rear housing 4b so as to be positioned radially outside of a first coil end 31a of the stator coil 36.

The rectifier 5 is located outside of the rear housing 4b and fixed to the rear end wall of the rear housing 4b so as to be axially aligned with the first coil end 31a of the stator coil 36.

The stator 2 includes a hollow cylindrical (or an annular) stator core 32 that is retained between the front and rear housings 4a and 4b so as to surround the rotor 3, the three-phase stator coil 36 mounted on the stator core 32, and insulators 34 that arranged to electrically insulate the stator coil 36 from the stator core 32.

Figure 2:
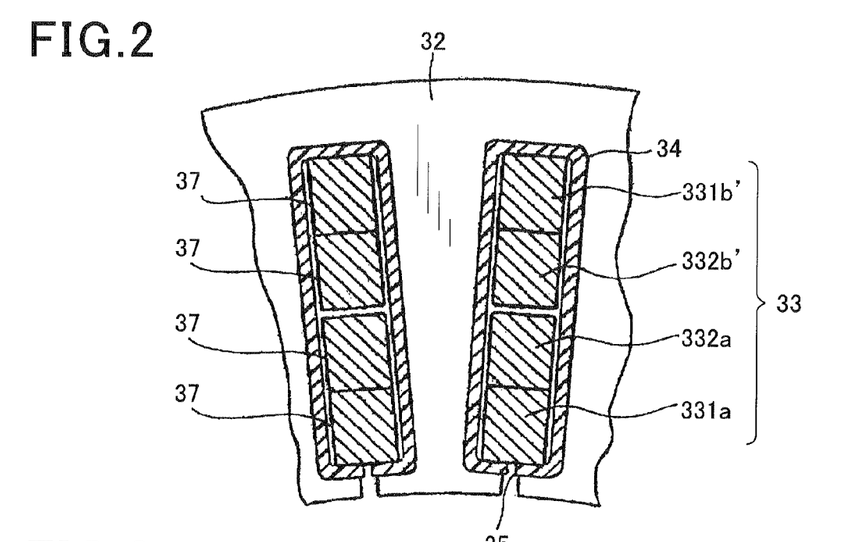
FIG. 2 is a cross-sectional view of part of the stator according to the first embodiment.

As shown in FIG. 2, the stator core 32 has a plurality of slots 35 formed therein. Each of the slots 35 extends in the axial direction of the stator core 32 so as to penetrate the stator core 32 in the axial direction. The slots 35 are spaced from one another in the circumferential direction of the stator core 32 at equal intervals. For each of the slots 35, the depth direction of the slot 35 coincides with a radial direction of the stator core 32. In the present embodiment, the number of the slots 35 formed in the stator core 32 is equal to 72. That is, the number of the slots 35 per pole per phase is equal to 2.

The stator coil 36 can be considered as being formed by connecting electric conductors received in the slots 35 of the stator core 32. That is, as shown in FIG. 2, in each of the slots 35 of the stator core 32, there are received an even number (e.g., four in the present embodiment) of electric conductors in alignment with each other in the radial direction of the stator core 32 (or the depth direction of the slot 35). Hereinafter, for the sake of convenience of explanation, the four electric conductors are sequentially referred to as an innermost electric conductor, an inner-middle electric conductor, an outer-middle electric conductor, and an outermost electric conductor from the radially inside to the radially outside of the slot 35. In addition, each of the electric conductors has an insulating coat 37 covering its outer surface, so that the electric conductors are electrically insulated from each other in the slot 35.

Moreover, the electric conductors received in the slots 35 of the stator core 32 are electrically connected to one another in a predetermined pattern, forming the stator coil 36.

Specifically, on one axial side of the stator core 32 (i.e., the rear side in FIG. 1), each corresponding pair of the electric conductors received in the slots 35 of the stator core 32 are electrically connected via one continuous connecting electric conductor. All the connecting electric conductors together make up the first coil end 31a of the stator coil 36. On the other axial side of the stator core 32 (i.e., the front side in FIG. 1), each corresponding pair of the electric conductors received in the slots 35 of the stator core 32 are electrically connected by joining a pair of protruding electric conductors that protrude outside of the slots 35 respectively from the corresponding pair of the electric conductors. All the protruding electric conductors together make up the second coil end 31b of the stator coil 36. In addition, each corresponding pair of the electric conductors are respectively arranged at two different layers in two different slots 35 that are spaced from each other by a predetermined pitch. This arrangement is made for securing sufficient clearances between the connecting electric conductors in the first coil end 31a and between the protruding electric conductors at the second coil end 31b while aligning them in a desired pattern at the first and second coil ends 31a and 31b.

Figure 3:
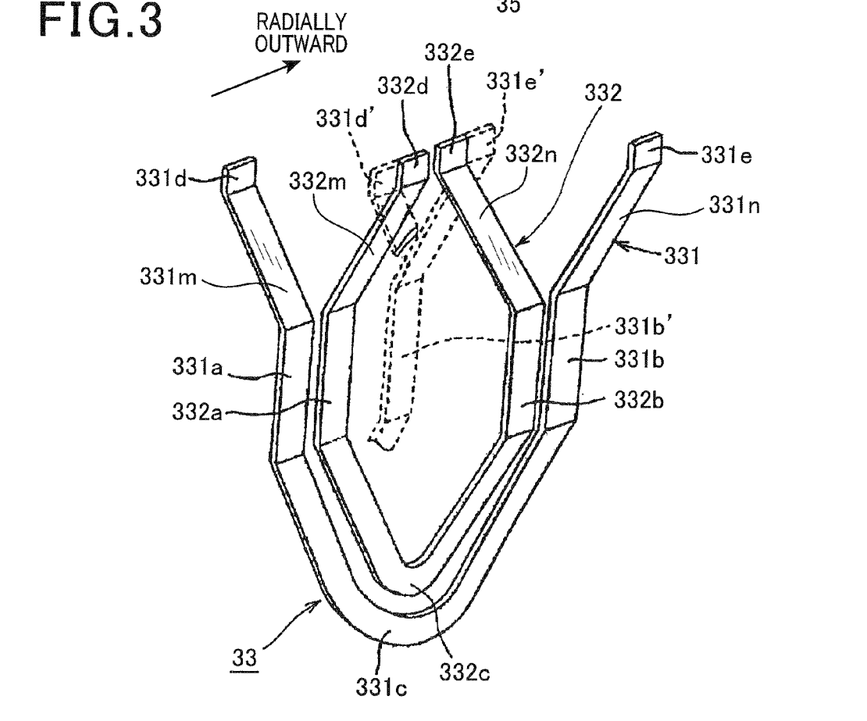
FIG. 3 is a schematic perspective view illustrating the configuration of a pair of large and small electric conductor segments used for forming a stator coil of the stator according to the first embodiment.

For example, referring to FIGS. 2 and 3, for one of the slots 35, the innermost electric conductor 331a in the slot 35 is electrically connected, via one connecting electric conductor 331c, to the outermost electric conductor 331b in another one of the slots 35 which is positioned away from the slot 35 by one magnetic pole pitch in the clockwise direction; the connecting electric conductor 331c is located on the one axial side of the stator core 32.

Similarly, for one of the slots 35, the inner-middle electric conductor 332a in the slot 35 is connected, via one connecting electric conductor 332c, to the outer-middle electric conductor 332b in another one of the slots 35 which is positioned away from the slot 35 by one magnetic pole pitch in the clockwise direction; the connecting electric conductor 332c is also located on the one axial side of the stator core 32.

Consequently, on the one axial side of the stator core 32, each of the connecting electric conductors that respectively connect pairs of the inner-middle and outer-middle electric conductors is circumscribed by a corresponding one of the connecting electric conductors that respectively connect pairs of the innermost and outermost electric conductors. As a result, all the connecting electric conductors that respectively connect pairs of the inner-middle and outer-middle electric conductors together form an axially inner layer of the first coil end 31a; all the connecting electric conductors that respectively connect pairs of the innermost and outermost electric conductors together form an axially outer layer of the first coil end 31a.

Moreover, for one of the slots 35, the inner-middle electric conductor 332a in the slot 35 is electrically connected, on the other axial side of the stator core 32, to the innermost electric conductor 331a' in another one of the slots 35 which is positioned away from the slot 35 by one magnetic pole pitch in the clockwise direction. More specifically, the inner-middle electric conductor 332a is electrically connected to the innermost electric conductor 331a' by joining a distal end part 332d of a protruding electric conductor 332m and a distal end part 331d' of a protruding electric conductor 331m'; the protruding electric conductors 332m and 331m' protrude outside of the slots 35 respectively from the inner-middle and innermost electric conductors 332a and 331a'.

Similarly, for one of the slots 35, the outermost electric conductor 331b' in the slot 35 is electrically connected, on the other axial side of the stator core 32, to the outer-middle electric conductor 332b in another one of the slots 35 which is positioned away from the slot 35 by one magnetic pole pitch in the clockwise direction. More specifically, the outermost electric conductor 331b' is electrically connected to the outer-middle electric conductor 332b by joining a distal end part 331e' of a protruding electric conductor 331n' and a distal end part 332e of a protruding electric conductor 332n; the protruding electric conductors 331n' and 332n protrude outside of the slots 35 respectively from the outermost and outer-middle electric conductors 331b' and 332b.

Figure 4:
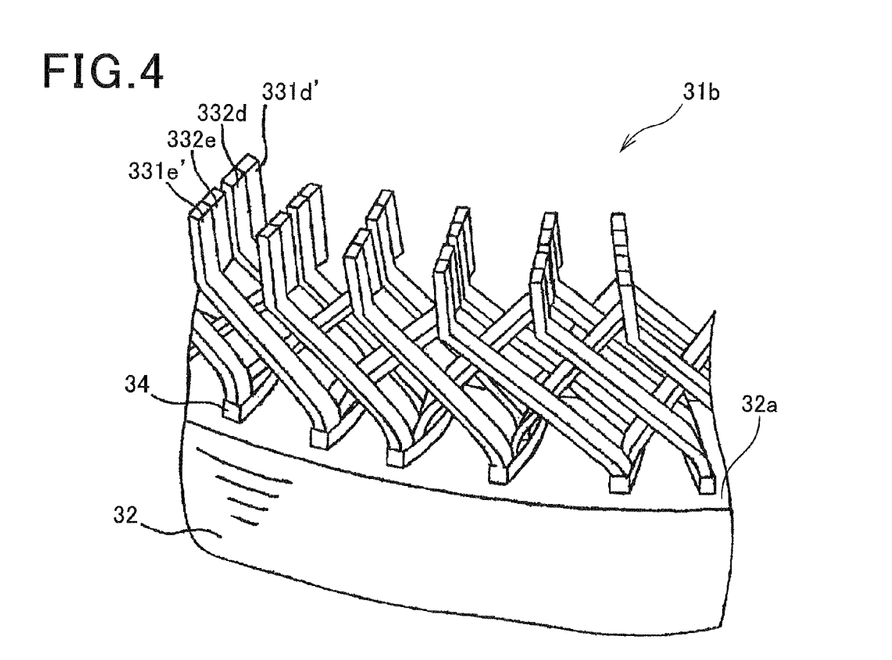
FIG. 4 is a perspective view showing part of a second coil end of the stator coil.

Consequently, as shown in FIG. 4, on the other axial side of the stator core 32, each of the joints formed between the distal end parts of the protruding electric conductor segments that protrude outside of the slots 35 respectively from the outermost and outer-middle electric conductors is radially aligned with a corresponding one of the joints formed between the distal end parts of the protruding electric conductor segments that protrude outside of the slots 35 respectively from the inner-middle and innermost electric conductors. As a result, all the joints formed between the distal end parts of the protruding electric conductor segments that protrude outside of the slots 35 respectively from the outermost and outer-middle electric conductors together form a radially outer layer of the second coil end 31b; all the joints formed between the distal end parts of the protruding electric conductor segments that protrude outside of the slots 35 respectively from the inner-middle and innermost electric conductors together form a radially inner layer of the second coil end 31b.

Moreover, in the present embodiment, the stator coil 36 is formed of a plurality of electric conductor segment pairs 33. As shown in FIG. 3, each electric conductor segment pair 33 consists of a large electric conductor segment 331 and a small electric conductor segment 332. Each of the large and small electric conductor segments 331 and 332 is made of a metal material (e.g., copper) and has a substantially U-shape and a substantially rectangular cross section. Further, each of the large and small electric conductor segments 331 and 332 is coated with a coating material, such as a polyamide-imide resin, a polyimide resin or a polyesterimide resin, so as to have an insulating coat 37 covering its outer surface. In addition, the coating material has a lower Young's modulus and a higher yield point than the metal material of which the large and second electric conductor segments 331 and 332 are made.

More specifically, in the present embodiment, as shown in FIG. 3, each set of one innermost electric conductor 331a, one outermost electric conductor 331b, one connecting electric conductor 331c, one protruding electric conductor 331m and one protruding electric conductor 331n is formed in one piece construction by using one of the large electric conductor segments 331. Here, the connecting electric conductor 331c connects the innermost and outermost electric conductors 331a and 331b on the one axial side of the stator core 32; the protruding electric conductor 331m extends from the innermost electric conductor 331a and protrudes, on the other axial side of the stator core 32, outside of the slot 35 in which is received the innermost electric conductor 331a; the protruding electric conductor 331n extends from the outermost electric conductor 331b and protrudes, on the other axial side of the stator core 32, outside of the slot 35 in which is received the outermost electric conductor 331b.

In other words, after being mounted to the stator core 32, each of the large electric conductor segments 331 includes: a pair of in-slot portions 331a and 331b that are respectively received in a pair of corresponding slots 35 of the stator core 32 which are spaced from each other by one magnetic pole pitch and arranged at the innermost and outermost layers in the corresponding slots 35; a turn portion 331c that connects the pair of in-slot portions 331a and 331b and is located on the one axial side of the stator core 32; and a pair of protruding portions 331m and 331n that respectively extend from the pair of in-slot portions 331a and 331b and protrude, on the other axial side of the stator core 32, outside of the corresponding slots 35.

On the other hand, each set of one inner-middle electric conductor 332a, one outer-middle electric conductor 332b, one connecting electric conductor 332c, one protruding electric conductor 332m and one protruding electric conductor 332n is formed in one piece construction by using one of the small electric conductor segments 332. Here, the connecting electric conductor 332c connects the inner-middle and outer-middle electric conductors 332a and 332b on the one axial side of the stator core 32; the protruding electric conductor 332m extends from the inner-middle electric conductor 332a and protrudes, on the other axial side of the stator core 32, outside of the slot 35 in which is received the inner-middle electric conductor 332a; the protruding electric conductor 332n extends from the outer-middle electric conductor 332b and protrudes, on the other axial side of the stator core 32, outside of the slot 35 in which is received the outer-middle electric conductor 332b.

In other words, after being mounted to the stator core 32, each of the small electric conductor segments 332 includes: a pair of in-slot portions 332a and 332b that are respectively received in a pair of corresponding slots 35 of the stator core 32 which are spaced from each other by one magnetic pole pitch and arranged at the inner-middle and outer-middle layers in the corresponding slots 35; a turn portion 332c that connects the pair of in-slot portions 332a and 332b and is located on the one axial side of the stator core 32; and a pair of protruding portions 332m and 332n that respectively extend from the pair of in-slot portions 332a and 332b and protrude, on the other axial side of the stator core 32, outside of the corresponding slots 35.

The above-described large and small electric conductor segments 331 and 332 are regularly arranged in the slots 35 of the stator core 32 and joined to one another, forming the stator coil 36 that extends around the stator core 32 by two turns. In addition, three electric conductor segments, which are different in shape from the large and small electric conductor segments 331 and 332, are also used in the stator coil 36 to form lead portions of the stator coil 36 and a turn portion that bridges the first and second turns of the stator coil 36. Here, the turn portion bridges the first and second turns of the stator coil 36 by bridging the axially inner and outer layers of the first coil end 31a of the stator coil 36.

Next, a method of manufacturing the stator 2 according to the present embodiment will be described.

Figure 7:
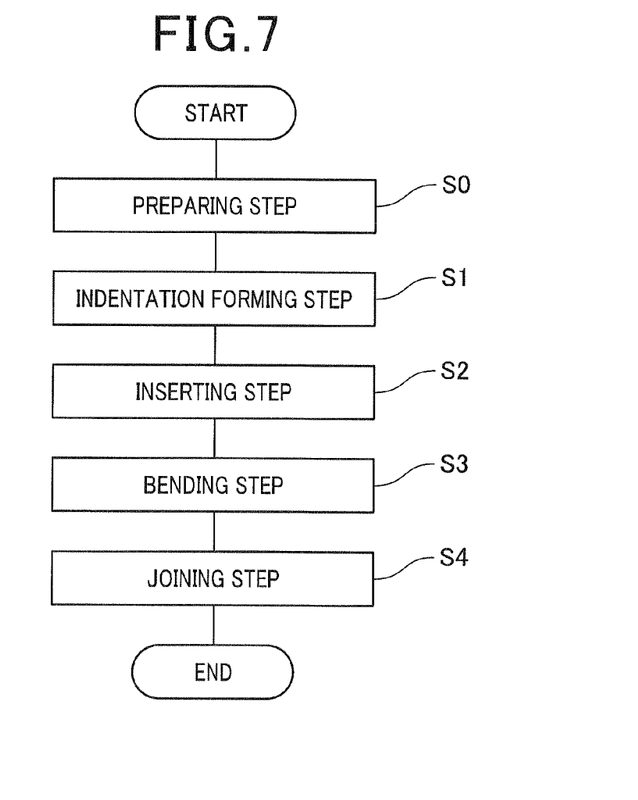
FIG. 7 is a flow chart illustrating a method of manufacturing the stator according to the first embodiment.

As shown in FIG. 7, the method according to the present embodiment includes a preparing step S0, an indentation forming step S1, an inserting step S2, a bending step S3 and a joining step S4.

In the preparing step S0, the hollow cylindrical stator core 32 and a plurality of straight electric conductor segments 33A for forming the electric conductor segment pairs 33 (see FIG. 3) are prepared.

Specifically, in this step, each of the straight electric conductor segments 33A is obtained by cutting a straight electric wire into a predetermined length; the electric wire has an insulating coat 37 covering its outer surface.

Consequently, each of the obtained straight electric conductor segments 33A also has the insulating coat 37 covering its outer surface. As described previously, the insulating coat 37 is formed of the coating material which has a lower Young's modulus and a higher yield point than the metal material of which the electric conductor segments 33A (or the electric conductor segment pairs 33) are made.

In addition, in this step, for each of the straight electric conductor segments 33A, the insulating coat 37 is removed from both opposite distal end parts of the straight electric conductor segment 33A. Consequently, at opposite ends of the straight electric conductor segment 33A, there are respectively formed a pair of bare parts of a predetermined length.

In the indentation forming step S1, for each of the straight electric conductor segments 33A, a pair of indentations are formed in a side face of the straight electric conductor segment 33A using a press machine 52. The press machine 52 includes, as shown in FIGS. 8A-8C, a die 51, a punch 53 and a load indicator 54.

The indentation forming step S1 will be described in more detail hereinafter by taking one of the straight electric conductor segments 33A for forming the large electric conductor segments 331 as an example. In addition, hereinafter, the indentations formed in the side faces of the straight electric conductor segments 33A for forming the large electric conductor segments 331 will be designated by reference numerals 331g and 331h, while those formed in the side faces of the straight electric conductor segments 33A for forming the small electric conductor segments 332 will be designated by reference numerals 332g and 332h.

Figure 8A:
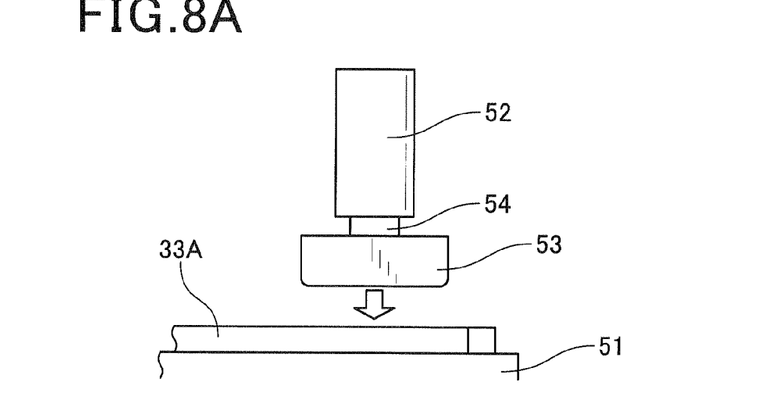
FIGS. 8A, 8B and 8C are schematic views together illustrating an indentation forming step of the method according to the first embodiment.
Figure 8B:
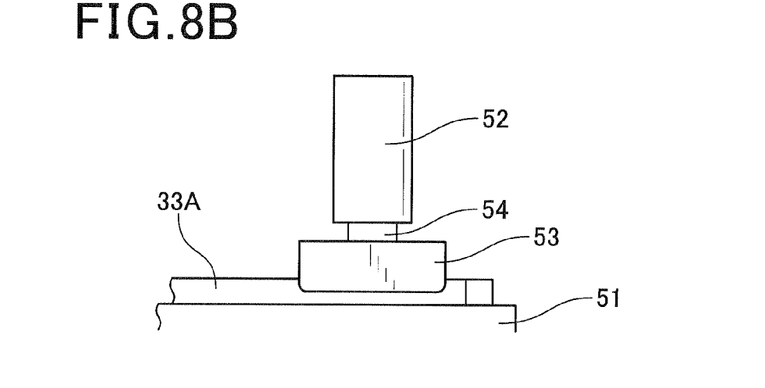
Figure 8C:
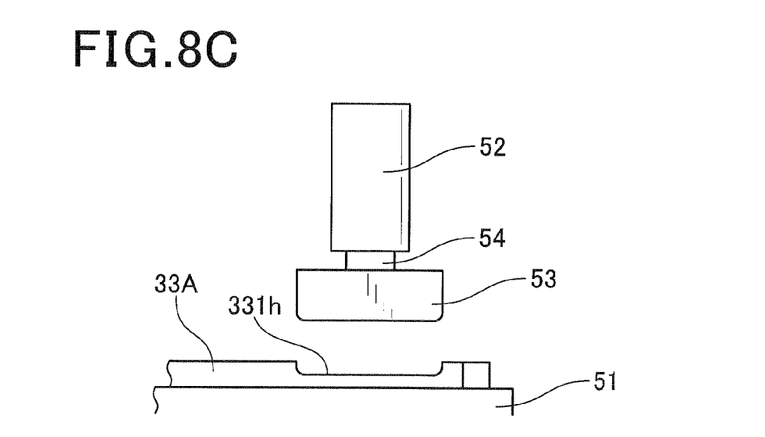

First, as shown in FIG. 8A, a portion of the straight electric conductor segment 33A, which includes one end of the straight electric conductor segment 33A and has a predetermined length, is placed on the die 51 of the press machine 52, with the side face of the straight electric conductor segment 33A facing upward. Then, as shown in FIG. 8B, the punch 53 of the press machine 52 is moved downward to press the portion of the straight electric conductor segment 33A, forming one indentation 331h in the side face of the straight electric conductor segment 33A. Thereafter, as shown in FIG. 8C, the punch 53 is removed from the straight electric conductor segment 33A.

In the present embodiment, during the formation of the indentation 331h, the pressing load of the punch 53, which is indicated by the load indicator 54, is controlled so as to be higher than the yield point of the straight electric conductor segment 33A but not higher than the yield point of the insulating coat 37.

Figure 9:
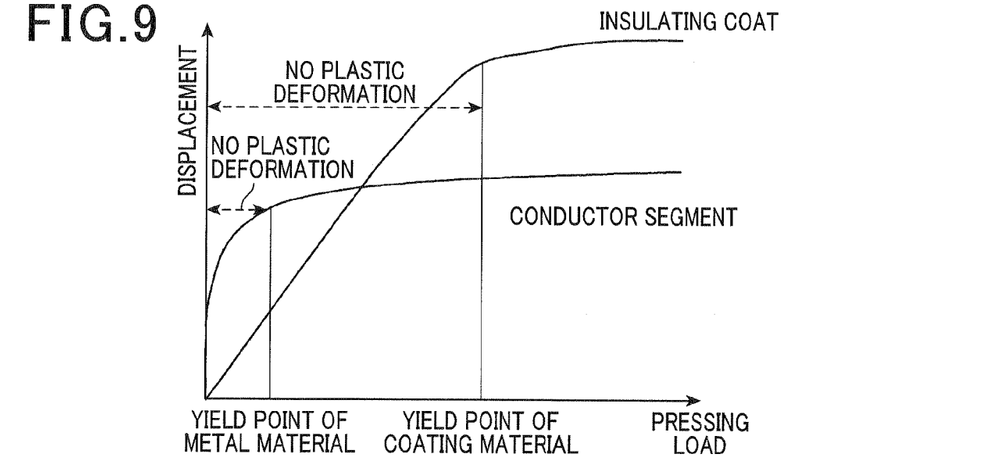
FIG. 9 is a graphical representation illustrating both the yield point of the electric conductor segments and the yield point of insulating coats covering the outer surfaces of the electric conductor segments.

More specifically, referring to FIG. 9, the straight electric conductor segment 33A is not plastically deformed until the pressing load of the punch 53 exceeds the yield point of the metal material of which the straight electric conductor segment 33A is made. Moreover, the insulating coat 37A is not plastically deformed until the pressing load exceeds the yield point of the coating material of which the insulating coat 37A is formed. When the pressing load falls within the range from the yield point of the metal material to the yield point of the coating material, only the straight electric conductor segment 33A is plastically deformed without plastic deformation of the insulating coat 37A.

Figure 10:
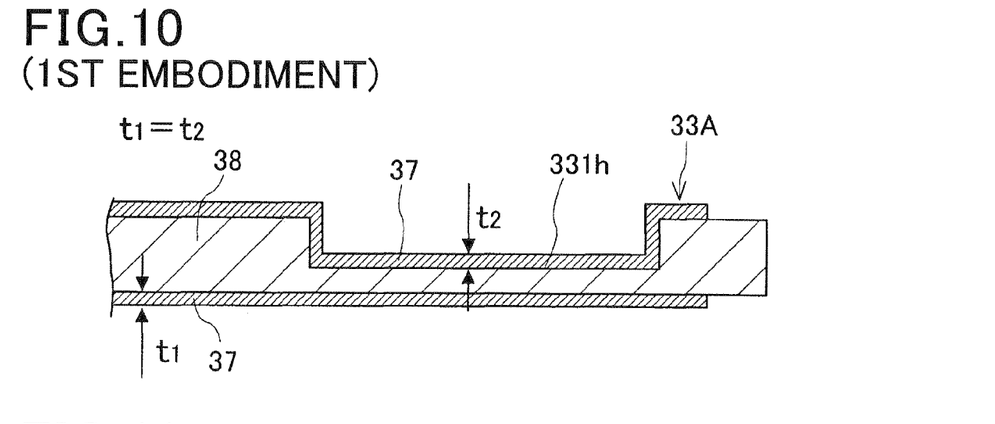
FIG. 10 is a cross-sectional view illustrating the formation of the indentations in the side faces of the electric conductor segments according to the first embodiment.

Consequently, by controlling the pressing load to fall within the above range, as shown in FIG. 10, the thickness of the straight electric conductor segment 33A is reduced at the indentation 331h. However, the thickness t2 of the insulating coat 37 at the indentation 331h is unchanged and thus kept substantially equal to the thickness t1 of the insulating coat 37 at a portion 38 of the straight electric conductor segment 33A; the portion 38 will make up one in-slot portion of the resultant large electric conductor segment 331. As a result, the insulating performance of the insulating coat 37 is prevented from being lowered by the formation of the indentation 331h.

It should be noted that the expression "substantially equal to" used hereinafter is intended to encompass both the case of the thickness t2 being exactly equal to the thickness t1 and the case of the thickness t2 being only slightly deviated from the thickness t1 due to errors and manufacturing tolerances.

Figure 11:
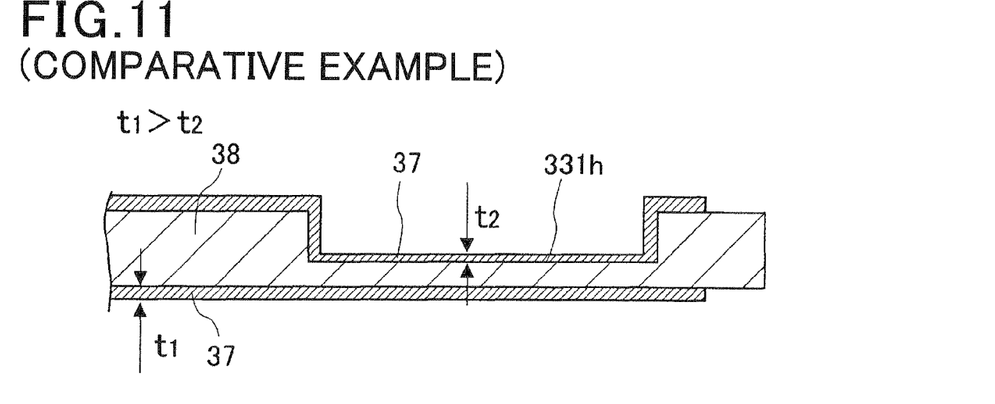
FIG. 11 is a cross-sectional view illustrating the formation of indentations in side faces of electric conductor segments according to a comparative example.

In addition, in a comparative example shown in FIG. 11, the straight electric conductor segment 33A is pressed with the pressing load higher than the yield point of the insulating coat 37. Consequently, the thickness t2 of the insulating coat 37 at the indentation 331h is reduced to become smaller than the thickness t1 of the insulating coat 37 at the portion 38 of the straight electric conductor segment 33A. As a result, the insulating performance of the insulating coat 37 is lowered at the indentation 331h.

After forming the indentation 331h, the above processes are repeated for another portion of the straight electric conductor segment 33A, which includes the other end of the straight electric conductor segment 33A and has the predetermined length, forming the other indentation 331g in the side face of the straight electric conductor segment 33A.

Moreover, the above processes are also performed for all the other straight electric conductor segments 33A. As a result, the indentations 331g and 331h are formed in the side faces of the straight electric conductor segments 33A for forming the large electric conductor segments 331; the indentations 332g and 332h are formed in the side faces of the straight electric conductor segments 33A for forming the small electric conductor segments 332.

Figure 6:
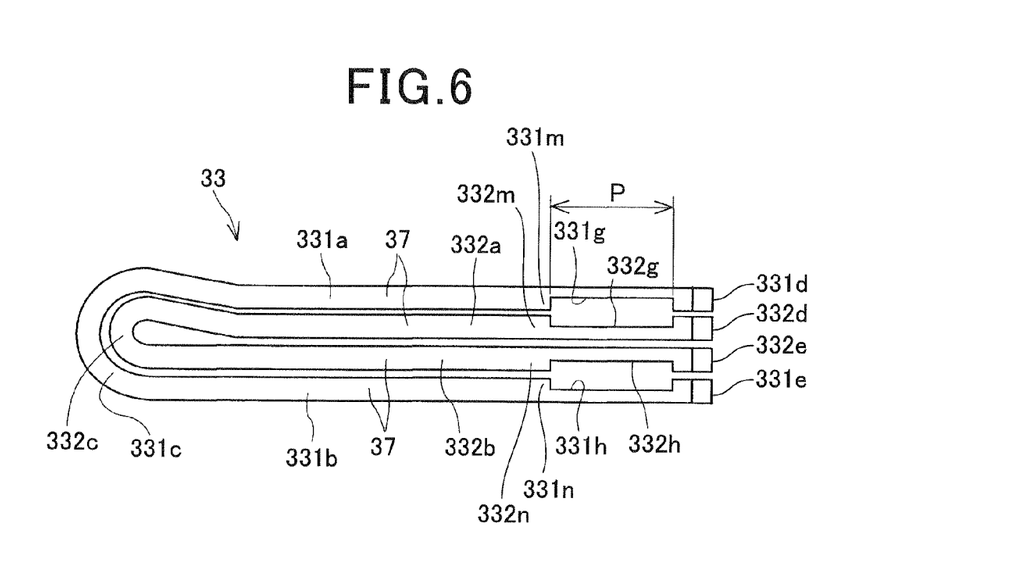
FIG. 6 is a schematic plan view illustrating the formation of indentations in side faces of the electric conductor segments used for forming the stator coil.

Thereafter, referring to FIG. 6, each of the straight electric conductor segments 33A for forming the large electric conductor segments 331 is bent into a substantially U-shape so that the indentations 331g and 331h face each other (i.e., both face inward of the straight electric conductor segment 33A). In contrast, each of the straight electric conductor segments 33A for forming the small electric conductor segments 332 is bent into a substantially U-shape so that the indentations 332g and 332h face away from each other (i.e., both face outward of the straight electric conductor segment 33A). As a result, a plurality of electric conductor segment pairs 33 as shown in FIG. 6 are obtained, each of which consists of one large electric conductor segment 331 and one small electric conductor segment 332.

In the inserting step S2, for each of the electric conductor segment pairs 33, the large and small electric conductor segments 331 and 332 of the pair are first put together so that the turn portion 332c of the small electric conductor segment 332 is circumscribed by the turn portion 331c of the large electric conductor segment 331, as shown in FIG. 6. Then, both the large and small electric conductor segments 331 and 332 are inserted into corresponding two of the slots 35 of the stator core 32 from the one axial side of the stator core 32 so that: the in-slot portion 331a of the large electric conductor segment 331 and the in-slot portion 332a of the small electric conductor segment 332 are respectively located at the innermost and inner-middle layers in one of the two corresponding slots 35; and the in-slot portion 331b of the large electric conductor segment 331 and the in-slot portion 332b of the small electric conductor segment 332 are respectively located at the outermost and outer-middle layers in the other corresponding slot 35. Consequently, the protruding portions 331m, 331n, 332m and 332n of the large and small electric conductor segments 331 and 332 protrude outside of the two corresponding slots 35 on the other axial side of the stator core. In addition, the two corresponding slots 35 are circumferentially spaced from each other by one magnetic pole pitch.

As a result, after inserting all the electric conductor segment pairs 33 into the corresponding slots 35 of the stator core 32, as shown in FIG. 2, in each of the slots 35, there are received four in-slot portions 331a, 332a, 332b' and 331b' of the electric conductor segments 331 and 332 in radial alignment with each other. Here, the superscript (') is used only for the purpose of indicating that the electric conductor segment pair 33 which includes the in-slot portions 331a and 332a is different from the electric conductor segment pair 33 which includes the in-slot portions 332b' and 331b'. More specifically, the electric conductor segment pair 33 which consists of the large and small electric conductor segments respectively having the in-slot portions 331a and 332a is circumferentially offset by one magnetic pole pitch from the electric conductor segment pair 33 which consists of the large and small electric conductor segments respectively having the in-slot portions 332b' and 331b'.

In addition, as shown in FIG. 2, in each of the slots 35, there exists a radial gap between the inner-middle in-slot portion 332a and the outer-middle in-slot portion 332b'. This radial gap is caused by springback of the substantially U-shaped electric conductor segments 331 and 332; the springback urges the turn portions 331c and 332c of the electric conductor segments 331 and 332 to spread.

In the bending step S3, for each of the large electric conductor segments 331, the protruding portions 331m and 331n of the large electric conductor segment 331 are respectively bent along opposite circumferential directions so as to widen the circumferential interval therebetween. Consequently, as shown in FIG. 3, the distal end parts 331d and 331e of the protruding portions 331m and 331n are respectively shifted in opposite circumferential directions by half a magnetic pole pitch (i.e., by one and a half slot); thus, the distal end parts 331d and 331e of the protruding portions 331m and 331n are circumferentially spaced from each other by one magnetic pole pitch (i.e., by three slots).

On the other hand, for each of the small electric conductor segments 332, the protruding portions 332m and 332n of the small electric conductor segment 332 are respectively bent along opposite circumferential directions so as to narrow the circumferential interval therebetween. Consequently, as shown in FIG. 3, the distal end parts 332d and 332e of the protruding portions 332m and 332n are respectively shifted in opposite circumferential directions by half a magnetic pole pitch (i.e., by one and a half slot); thus, the distal end parts 332d and 332e of the protruding portions 332m and 332n are brought into radial alignment with each other.

As a result, as shown in FIG. 4, on the other axial side of the stator core 32, each radially-adjacent pair of the protruding portions of the large and small electric conductor segments 331 and 332 extend obliquely with respect to the axial end face 32a of the stator core 32 and respectively along opposite circumferential directions. Further, each of the protruding portions of the large and small electric conductor segments 331 and 332 intersects at least one (e.g., two in the present embodiment) of the other protruding portions.

In the joining step S4, corresponding pairs of the distal end parts of the protruding portions of the large and small electric conductor segments 331 and 332 are joined by, for example, ultrasonic welding, arc welding or soldering.

Specifically, in this step, as shown in FIGS. 3-4, at the radially outer layer of the second coil end 31b, each of the distal end parts 332e of the protruding portions 332n of the small electric conductor segments 332 is joined to a corresponding one of the distal end parts 331e' of the protruding portions 331n' of the large electric conductor segments 331'; the protruding portions 332n of the small electric conductor segments 332 respectively extend from the outer-middle in-slot portions 332b of the small electric conductor segments 332; the protruding portions 331n' of the large electric conductor segments 331' respectively extend from the outer in-slot portions 331b' of the large electric conductor segments 331'. Here, the superscript (') is used only for the purpose of indicating that for each joined pair of the distal end parts 332e and 331e', the small electric conductor segment 332 that includes the distal end part 332e of the protruding portion 332n belongs to a different electric conductor segment pair 33 from the large electric conductor segment 331' that includes the distal end part 331e' of the protruding portion 331n'.

Similarly, at the radially inner layer of the second coil end 31b, each of the distal end parts 332d of the protruding portions 332m of the small electric conductor segments 332 is joined to a corresponding one of the distal end parts 331d' of the protruding portions 331m' of the large electric conductor segments 331'; the protruding portions 332m of the small electric conductor segments 332 respectively extend from the inner-middle in-slot portions 332a of the small electric conductor segments 332; the protruding portions 331m' of the large electric conductor segments 331' respectively extend from the inner in-slot portions 331a' of the large electric conductor segments 331'. Here, the superscript (') is used only for the purpose of indicating that for each joined pair of the distal end parts 332d and 331d', the small electric conductor segment 332 that includes the distal end part 332d of the protruding portion 332m belongs to a different electric conductor segment pair 33 from the large electric conductor segment 331' that includes the distal end part 331d' of the protruding portion 331m'.

As a result, the stator 2 according to the present embodiment is obtained.

In addition, in the present embodiment, the depth of the indentations formed in the side faces of the protruding portions of the electric conductor segments 331 and 332 is set to be, for example, 0.2 mm, while the thickness of the electric conductor segments 331 and 332 before the formation of the indentations is equal to 2.2 mm. Moreover, the thickness of the insulating coats 37 covering the outer surfaces of the electric conductor segments 331 and 332 is set to be, for example, 40 μm.

According to the present embodiment, it is possible to achieve the following advantages.

Figure 5:
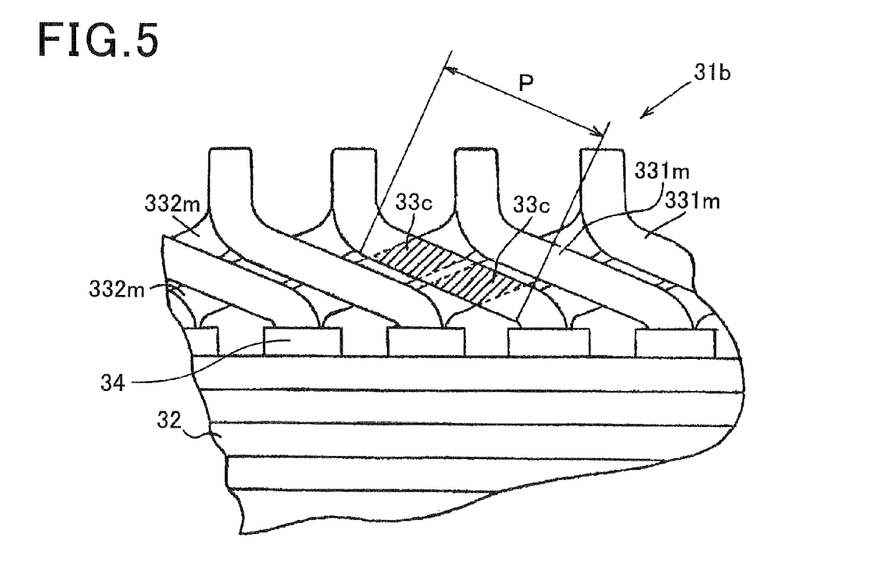
FIG. 5 is a side view showing part of the second coil end of the stator coil from the radially inside of the stator.

In the present embodiment, the stator 2 includes the hollow cylindrical stator core 32 and the stator coil 36. The stator core 32 has the slots 35 formed therein; the slots 35 are spaced from one another in the circumferential direction of the stator core 32 at equal intervals. The stator coil 36 is formed of the electric conductor segments 331 and 332 mounted on the stator core 32. Each of the electric conductor segments 331 and 332 includes the two in-slot portions 331a and 331b or 332a and 332b, which are respectively received in the two corresponding slots 35 of the stator core 32, and the two protruding portions 331m and 331n or 332m and 332n that respectively protrude from the in-slot portions outside of the corresponding slots 35 and extend obliquely with respect to the axial end face 32a of the stator core 32. In each of the slots 35 of the stator core 32, there are received a predetermined number (e.g., four in the present embodiment) of the in-slot portions 331a, 331b, 332a and 332b of the electric conductor segments 331 and 332 in radial alignment with each other. Each of the electric conductor segments 331 and 332 has the insulating coat 37 covering its outer surface so that the in-slot portions 331a, 331b, 332a and 332b of the electric conductor segments 331 and 332 are electrically insulated from each other in the slots 35 of the stator core 32. Each of the protruding portions 331m, 331n, 332m and 332n of the electric conductor segments 331 and 332 has the distal end part 331d, 331e, 332d or 332e. Corresponding pairs of the distal end parts 331d, 331e, 332d and 32e of the protruding portions 331m, 331n, 332m and 332n of the electric conductor segments 331 and 332 are joined to each other. Each of the protruding portions 331m, 331n, 332m and 332n of the electric conductor segments 331 and 332 radially faces and intersects at least one (e.g., two in the present embodiment as shown in FIGS. 4-5) of the other protruding portions. For each intersecting pair of the protruding portions 331m, 331n, 332m and 332n of the electric conductor segments 331 and 332, each of the two protruding portions of the intersecting pair has the indentation 331g, 331h, 332g or 332h formed in the side face thereof radially facing the other protruding portion at the intersection 33c of the two protruding portions. For each of the electric conductor segments 331 and 332, the thickness t2 of the insulating coat 37 at the indentations 331g and 331h or 332g and 332h of the electric conductor segment is substantially equal to the thickness t1 of the insulating coat 37 at the in-slot portions 331a and 331b or 332a and 332b of the electric conductor segment.

Consequently, with the indentations 331g, 331h, 332g and 332h formed in the side faces of the protruding portions 331m, 331n, 332m and 332n of the electric conductor segments 331 and 332, a sufficient clearance can be secured between each intersecting pair of the protruding portions of the electric conductor segments. As a result, it is possible to improve electrical insulation between each intersecting pair of the protruding portions of the electric conductor segments. Moreover, the cooling air flow created by the cooling fan 11 can reliably pass through the clearance between each intersecting pair of the protruding portions of the electric conductor segments, thereby effectively cooling the protruding portions.

Furthermore, with the thickness t2 of the insulating coats 37 at the indentations 331g, 331h, 332g and 332h substantially equal to the thickness t1 of the insulating coats at the in-slot portions 331a, 331b, 332a and 332b of the electric conductor segments 331 and 332, the insulating performance of the insulating coats 37 is prevented from being lowered at the indentations.

In the present embodiment, as described previously, for each intersecting pair of the protruding portions 331m, 331n, 332m and 332n of the electric conductor segments 331 and 332, both the protruding portions of the intersecting pair have the respective indentations formed in the side faces thereof.

Consequently, it is possible to further improve electrical insulation between the protruding portions and more effectively cool the protruding portions.

In the present embodiment, as shown in FIG. 5, each of the protruding portions 331m, 331n, 332m and 332n of the electric conductor segments 331 and 332 intersects two of the other protruding portions. Further, for each of the protruding portions of the electric conductor segments, the indentation 331g, 331h, 332g or 332h is formed in the side face of the protruding portion only within a range P which includes both the intersections 33c of the protruding portion with the two other protruding portions.

Consequently, with the formation of the indentation within only the range P, it is possible to reduce the pressing load for forming the indentation in the side face of the protruding portion in comparison with the case of forming the indentation over the entire length of the protruding portion. As a result, it is possible to reduce the size of the press machine 52, thereby lowering the manufacturing cost of the stator 2.

In the present embodiment, the coating material of which the insulating coats 37 are formed has a lower Young's modulus and a higher yield point than the metal material of the electric conductor segments 331 and 332 are made.

Consequently, in the indentation forming step S1, it is possible to keep the thickness t2 of the insulating coats 37 at the indentations 331g, 331h, 332g and 332h substantially equal to the thickness t1 of the insulating coats 37 at the in-slot portions 331a, 331b, 332a and 332b of the electric conductor segments 331 and 332 by setting the pressing load to be higher than the yield point of the metal material but not higher than the yield point of the coating material.

In the present embodiment, the method of manufacturing the stator 2 includes the indentation forming step S1, the inserting step S2, the bending step S3 and the joining step S4. In the indentation step S1, the indentations 331g, 331h, 332g and 332h are formed in the side faces of the respective protruding portions 331m, 331n, 332m and 332n of the electric conductor segments 331 and 332 by pressing. In the inserting step S2, the in-slot portions 331a, 331b, 332a and 332b of the electric conductor segments 331 and 332 are inserted, from the one axial side of the stator core 32, into the corresponding slots 35 of the stator core 32 so as to have the protruding portions 331m, 331n, 332m and 332n of the electric conductor segments 331 and 332 protruding outside of the corresponding slots 35 on the other axial side of the stator core 32. In the bending step S3, the protruding portions 331*m*, 331*n*, 332*m* and 332*n* of the electric conductor segments 331 and 332 are bent so as to extend obliquely with respect to the axial end face 32*a* of the stator core 32 and thus make each of the protruding portions of the electric conductor segments radially face and intersect at least one (e.g., two in the present embodiment) of the other protruding portions. In the joining step S4, corresponding pairs of the distal end parts 331*d*, 331*e*, 332*d* and 332*e* of the protruding portions 331*m*, 331*n*, 332*m* and 332*n* of the electric conductor segments 331 and 332 are joined. Further, the indentation forming step S1, the pressing load is set so as to be higher than the yield point of the metal material of which the electric conductor segments 331 and 332 are made, but not higher than the yield point of the coating material of which the insulating coats 37 are formed.

With the above method, it is possible to keep the thickness t2 of the insulating coats 37 at the indentations 331*g*, 331*h*, 332*g* and 332*h* substantially equal to the thickness t1 of the insulating coats 37 at the in-slot portions 331*a*, 331*b*, 332*a* and 332*b* of the electric conductor segments 331 and 332. As a result, it is possible to provide a sufficient clearance between each intersecting pair of the protruding portions 331*m*, 331*n*, 332*m* and 332*n* of the electric conductor segments 331 and 332 without lowering the insulating performance of the insulating coats 37 at the indentations 331*g*, 331*h*, 332*g* and 332*h*.

Second Embodiment

In the previous embodiment, for each of the protruding portions 331*m*, 331*n*, 332*m* and 332*n* of the electric conductor segments 331 and 332, the indentation 331*g*, 331*h*, 332*g* or 332*h* is formed in the side face of the protruding portion only within the range P which includes both the intersections 33*c* of the protruding portion with the two other protruding portions (see FIGS. 5-6).

Figure 12:
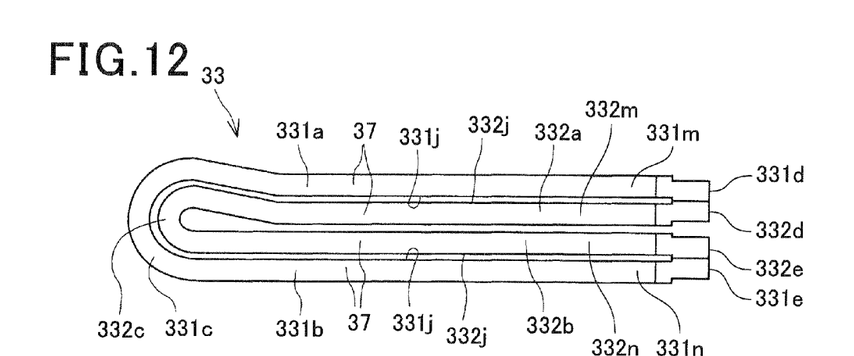
FIG. 12 is a schematic plan view illustrating the formation of indentations in side faces of electric conductor segments according to a second embodiment.

In comparison, in the present embodiment, as shown FIG. 12, for each electric conductor segment pair 33, an indentation 331*j* is formed in the interior side face of the entire large electric conductor segment 331 except for the distal end parts 331*d* and 331*e* of the protruding portions 331*m* and 331*n* of the large electric conductor segment 331; an indentation 332*j* is formed in the exterior side face of the entire small electric conductor segment 332 except for the distal end parts 332*d* and 332*e* of the protruding portions 332*m* and 332*n* of the small electric conductor segment 332. Consequently, for the large electric conductor segment 331, the distal end parts 331*d* and 331*e* of the protruding portions 331*m* and 331*n* are offset inward from the remaining parts of the protruding portions 331*m* and 331*n*; for the small electric conductor segment 332, the distal end parts 332*d* and 332*e* of the protruding portions 332*m* and 332*n* are offset outward from the remaining parts of the protruding portions 332*m* and 332*n*. As a result, the distal end part 331*d* of the protruding portion 331*m* of the large electric conductor segment 331 and the distal end part 332*d* of the protruding portion 332*m* of the small electric conductor segment 332 become closer to each other; the distal end part 331*e* of the protruding portion 331*n* of the large electric conductor segment 331 and the distal end part 332*e* of the protruding portion 332*n* of the small electric conductor segment 332 become closer to each other.

In addition, for each of the large electric conductor segments 331, the insulating coat 37 is removed not only from the distal end parts 331*d* and 331*e* of the protruding portions 331*m* and 331*n* but also from opposite end parts of the indentation 331*j* that respectively extend from the distal end parts 331*d* and 331*e* of the protruding portions 331*m* and 331*n* for a small given distance. Similarly, for each of the small electric conductor segments 332, the insulating coat 37 is removed not only from the distal end parts 332*d* and 332*e* of the protruding portions 332*m* and 332*n* but also from opposite end parts of the indentation 332*j* that respectively extend from the distal end parts 332*d* and 332*e* of the protruding portions 332*m* and 332*n* for the small given distance.

Consequently, by removing the insulating coats 37 from the electric conductor segments 331 and 332 in the above manner, it is possible to facilitate the process of joining corresponding pairs of the distal end parts 331*d*, 331*e*, 332*d* and 32*e* of the protruding portions 331*m*, 331*n*, 332*m* and 332*n* of the electric conductor segments 331 and 332.

Next, a method of manufacturing the stator 2 according to the present embodiment will be described.

In the present embodiment, the method also includes a preparing step S0, an indentation forming step S1, an inserting step S2, a bending step S3 and a joining step S4 as in the first embodiment. Further, except the indentation forming step S1, all the steps of the method according to the present embodiment are the same as those of the method according to the first embodiment. Accordingly, only the indentation forming step S1 of the method according to the present embodiment will be described hereinafter.

In the indentation forming step S1, for each of straight electric conductor segments 33A, an indentation is formed in a side face of the straight electric conductor segment 33A using the press machine 52.

As described in the first embodiment, each of the straight electric conductor segments 33A is obtained by cutting a straight electric wire into a predetermined length; the electric wire has an insulating coat 37 covering its outer surface. The insulating coat 37 is formed of the coating material which has a lower Young's modulus and a higher yield point than the metal material of which the electric conductor segments 33A are made. In addition, the press machine 52 includes the die 51, the punch 53 and the load indicator 54 (see FIGS. 8A-8C).

The indentation forming step S1 will be described in more detail hereinafter by taking one of the straight electric conductor segments 33A for forming the large electric conductor segments 331 as an example. In addition, hereinafter, the indentations formed in the side faces of the straight electric conductor segments 33A for forming the large electric conductor segments 331 will be designated by the reference numeral 331*j*, while those formed in the side faces of the straight electric conductor segments 33A for forming the small electric conductor segments 332 will be designated by the reference numeral 332*j*.

Figure 13A:
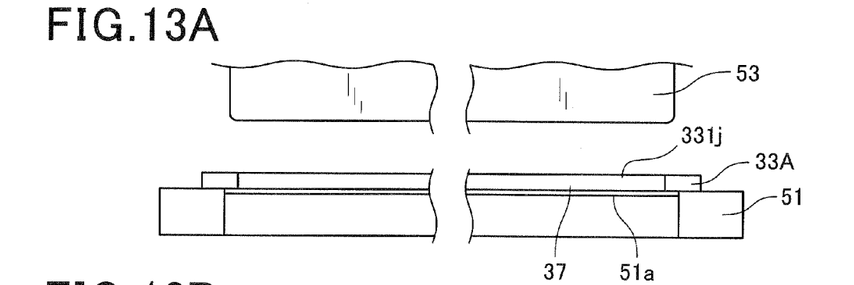
FIGS. 13A, 13B and 13C are schematic views together illustrating an indentation forming step of a method of manufacturing a stator according to the second embodiment.
Figure 13B:
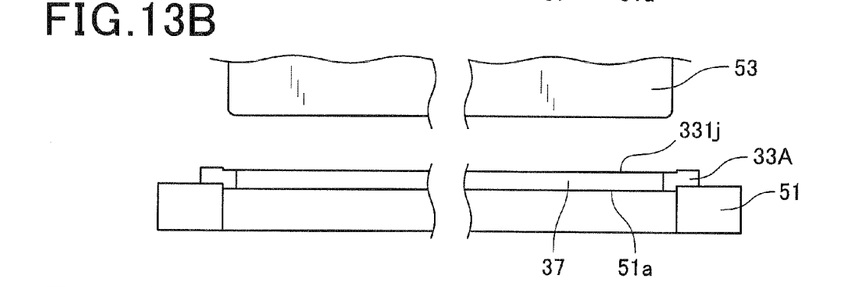
Figure 13C:
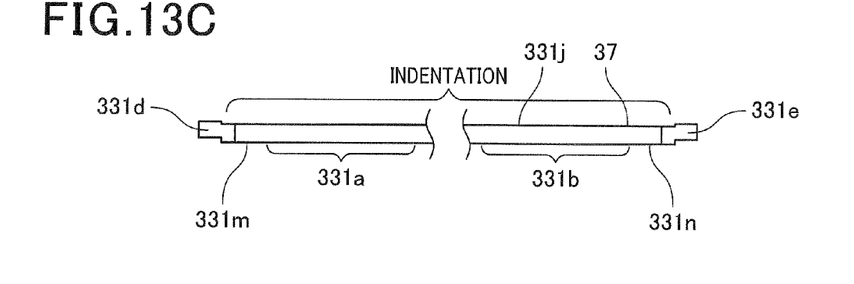

First, as shown in FIG. 13A, the entire straight electric conductor segment 33A is placed on the die 51 of the press machine 52. Then, as shown in FIG. 13B, the punch 53 of the press machine 52 is moved downward to press the entire straight electric conductor segment 33A except for an opposite pair of distal end parts of the straight electric conductor segments 33A; the distal end parts will make up the distal end parts 331*d* and 331*e* of the protruding portions 331*m* and 331*n* of the resultant large electric conductor segment 331. Consequently, the entire straight electric conductor segment 33A except for the distal end parts is displaced downward into a shallow recess 51*a* formed in an upper surface of the die 51, thereby forming the indentation 331*j* on the upper side face of the straight electric conductor segment 33A and offsetting the distal end parts upward from the remainder of the straight electric conductor segment 33A. Thereafter, as shown in FIG. 13C, the punch 53 is removed from the straight electric conductor segment 33A.

As in the first embodiment, during the formation of the indentation 331*j*, the pressing load of the punch 53, which is indicated by the load indicator 54, is controlled so as to be higher than the yield point of the straight electric conductor segment 33A but not higher than the yield point of the insulating coat 37.

Consequently, by controlling the pressing load to fall within the above range, the thickness of the straight electric conductor segment 33A is reduced at the indentation 331*j*. However, the thickness of the insulating coat 37 is kept unchanged and thus constant over the entire length of the straight electric conductor segment 33A. Accordingly, in the resultant large electric conductor segment 331, the thickness of the insulating coat 37 at the indentation 331*j* will be substantially equal to that at the in-slot portions 331*a* and 331*b* of the large electric conductor segment 331. That is to say, the insulating performance of the insulating coat 37 is prevented from being lowered by the formation of the indentation 331*j*.

Figure 14:
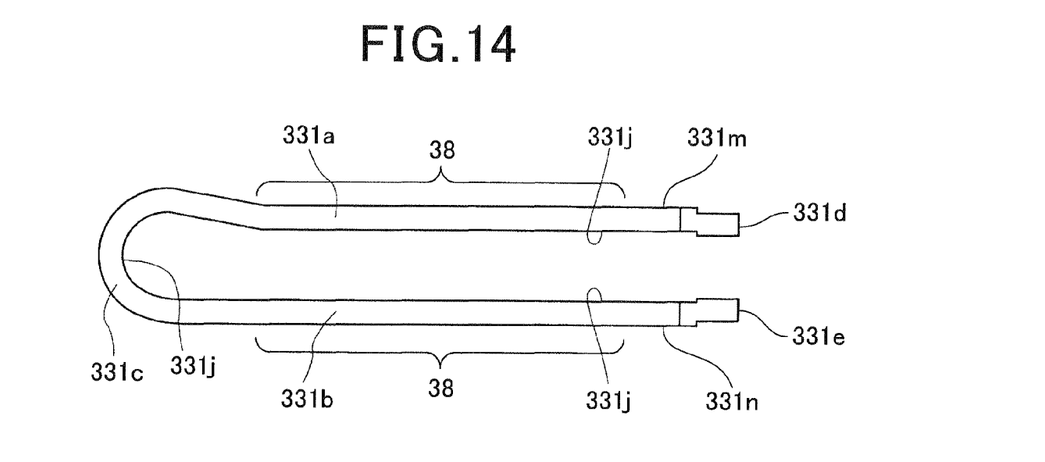
FIG. 14 is a schematic plan view of one of the electric conductor segments according to the second embodiment which has been bent into a substantially U-shape.

After the formation of the indentation 331*j*, the straight electric conductor segment 33A is bent into a substantially U-shape as shown in FIG. 14. Consequently, the side face in which the indentation 331*j* is formed becomes the interior side face of the resultant U-shaped electric conductor segment 33A.

The above processes are also performed for all the other straight electric conductor segments 33A. As a result, a plurality of electric conductor segment pairs 33 as shown in FIG. 12 are obtained, each of which consists of one large electric conductor segment 331 and one small electric conductor segment 332. Then, the indention forming step S1 is completed.

With the above method of manufacturing the stator 2 according to the present embodiment, it is possible to make the thickness of the insulating coats 37 at the indentations 331*j* and 332*j* substantially equal to the thickness of the insulating coats 37 at the in-slot portions 331*a*, 331*b*, 332*a* and 332*b* of the electric conductor segments 331 and 332.

Consequently, in the stator core 2, a sufficient clearance can be secured between each intersecting pair of the protruding portions 331*m*, 331*n*, 332*m* and 332*n* of the electric conductor segments 331 and 332 without lowering the insulating performance of the insulating coats 37 at the indentations 331*j* and 332*j*. As a result, it is possible to improve both electrical insulation between each intersecting pair of the protruding portions 331*m*, 331*n*, 332*m* and 332*n* of the electric conductor segments 331 and 332 and the cooling of the protruding portions 331*m*, 331*n*, 332*m* and 332*n* by the cooling air flow created by the cooling fan 11.

Moreover, in the present embodiment, for each of the protruding portions 331*m*, 331*n*, 332*m* and 332*n* of the electric conductor segments 331 and 332, the distal end part of the protruding portion is radially offset from the remainder of the protruding portion. Consequently, the radial distance between each corresponding pair of the distal end parts 331*d*, 331*e*, 332*d* and 32*e* of the protruding portions 331*m*, 331*n*, 332*m* and 332*n* of the electric conductor segments 331 and 332 is reduced, thereby facilitating the process of joining each corresponding pair of the distal end parts 331*d*, 331*e*, 332*d* and 32*e*.

While the above particular embodiments have been shown and described, it will be understood by those skilled in the art that various modifications, changes, and improvements may be made without departing from the spirit of the present invention.

For example, in the second embodiment, for each of the large and small electric conductor segments 331 and 332, the indentation is formed in the side face of the entire electric conductor segment except for the distal end parts of the protruding portions of the electric conductor segment.

Figure 15:
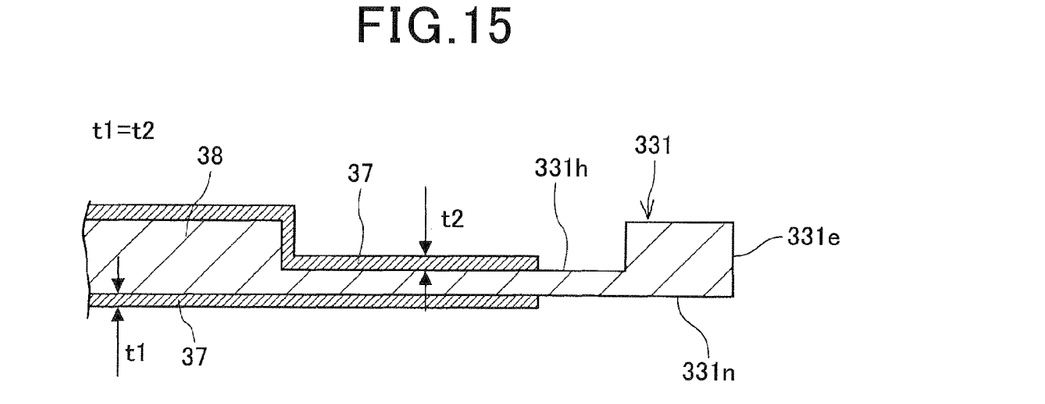
FIG. 15 is a cross-sectional view of one of electric conductor segments according to a modification.

However, it is also possible to form, for either the large electric conductor segments 331 or the small electric conductor segments 332, indentations in the side faces of the protruding portions as in the first embodiment. For example, it is possible to form, as shown in FIG. 15, the indentations 331*g* and 331*h* in the side faces of the protruding portions 331*m* and 331*n* of the large electric conductor segments 331 as in the first embodiment while forming the indentions 332*j* in the side faces of the small electric conductor segments 332 as in the second embodiment.

Moreover, in the previous embodiments, for each intersecting pair of the protruding portions 331*m*, 331*n*, 332*m* and 332*n* of the electric conductor segments 331 and 332, both the protruding portions of the intersecting pair have the respective indentations formed in the side faces thereof.

However, it is also possible to form, for each intersecting pair of the protruding portions 331*m*, 331*n*, 332*m* and 332*n* of the electric conductor segments 331 and 332, the indentation in the side face of only one of the two protruding portions of the intersecting pair.

In the previous embodiments, the stator coil 36 is formed of the substantially U-shaped electric conductor segments 331 and 332, each of which consists of the pair of in-slot portions, the turn portion, and the pair of protruding portions.

However, the stator coil 36 may also be formed of a plurality of electric conductor segments each of which consists of an in-slot portion received in a corresponding one of the slots 35 of the stator core 32 and a pair of protruding portions that protrude from the in-slot portion outside of the corresponding slot 35 respectively on opposite axial sides of the stator core 32.

In the previous embodiments, the present invention is directed to the stator 2 for the automotive alternator 1. However, the invention can also be applied to stators for other electric rotating machines, such as a stator for an electric motor and a stator for a motor-generator that can function both as an electric motor and as an electric generator.

What is claimed is:

1. A stator of a rotating electric machine, the stator comprising:
   a stator core having a plurality of slots; and
   a multi-phase stator coil formed by connecting a plurality of conductor segments each provided with an insulating coat, the conductor segments being received in radial alignment in the slots so as to be electrically insulated from one another, the conductor segments having end portions protruding outside the slots, the end portions being jointed to one another by welding to form a coil end,
   wherein
   in the coil end, one conductor segment is arranged so to intersect other conductor segments, which are radially adjacent to the one conductor segment, at one or more spots,
   the one conductor segment has a radially-recessed indentation formed in a side face thereof facing the other conductor segments at any of the intersections,
   for the insulating coat that covers an outer surface of the one electric conductor segment, a thickness of the insulating coat covering the outer surface of the indentation is set to be equal to a thickness of the insulating coat covering the outer surface of an in-slot portion of the one electric conductor segment, the insulating coats are formed of a material that has a lower Young's modulus and a higher yield point than the conductor segments, and the insulating coats and the conductor segments have properties such that on a two-dimensional coordinate plane, where the abscissa indicates pressing load used in forming the indentation by pressing and the ordinate indicates displacement during the pressing, a first characteristic line and a second characteristic line intersect each other between the yield point of the conductor segments and the yield point of the insulating coats, where the first characteristic line represents the relationship between pressing load and displacement of the conductor segment, and the second characteristic line represents the relationship between pressing load and displacement of the insulating coat.

2. A method of manufacturing a stator of a rotating electric machine, the stator comprising: a stator core having a plurality of slots; a multi-phase stator coil formed by connecting a plurality of conductor segments each provided with an insulating coat, the conductor segments being received in radial alignment in the slots so as to be electrically insulated from one another, the conductor segments having end portions protruding outside the slots, the end portions being jointed to one another by welding to form a coil end, the method comprising:

preparing the conductor segments and the insulating coats so that the insulating coats are formed of a material which has a lower Young's modulus and a higher yield point than the conductor segments and so that on a two-dimensional coordinate plane, where the abscissa indicates a pressing load used in forming radial indentations in the conductor segments and the ordinate indicates displacement when forming the radial indentations, a first characteristic line and a second characteristic line intersect each other between the yield point of the conductor segments and the yield point of the insulating coats, where the first characteristic line represents the relationship between the pressing load and displacement of the conductor segments, and the second characteristic line represents the relationship between the pressing load and displacement of the insulating coats;

forming the radial indentations in side faces of the conductor segments by pressing with the pressing load in a range higher than the yield point of the conductor segments but not higher than the yield point of the insulating coats;

inserting the conductor segments into the slots so as to be radially adjacent to one another;

inclining each conductor segment and another conductor segment, which is radially adjacent to the each conductor segment, respectively in opposite circumferential directions by a predetermined magnetic pole pitch and thereby making the indentations formed in the side faces of each conductor segment and the other conductor segment face and intersect each other; and joining an end portion of each conductor segment to an end portion of another conductor segment which is radially adjacent to the each conductor segment.

* * * * *